Nov. 11, 1969  D. WIEBE  3,477,289
COMBINED RATE OF FLOW, PRESSURE AND TEMPERATURE GAGE
Filed Aug. 25, 1966  2 Sheets-Sheet 1

INVENTOR
DONALD WIEBE
BY
ATTORNEY

Nov. 11, 1969  D. WIEBE  3,477,289
COMBINED RATE OF FLOW, PRESSURE AND TEMPERATURE GAGE
Filed Aug. 25, 1966  2 Sheets-Sheet 2
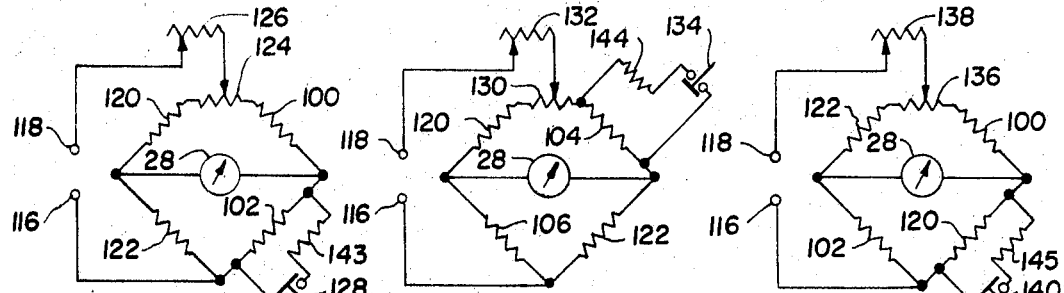
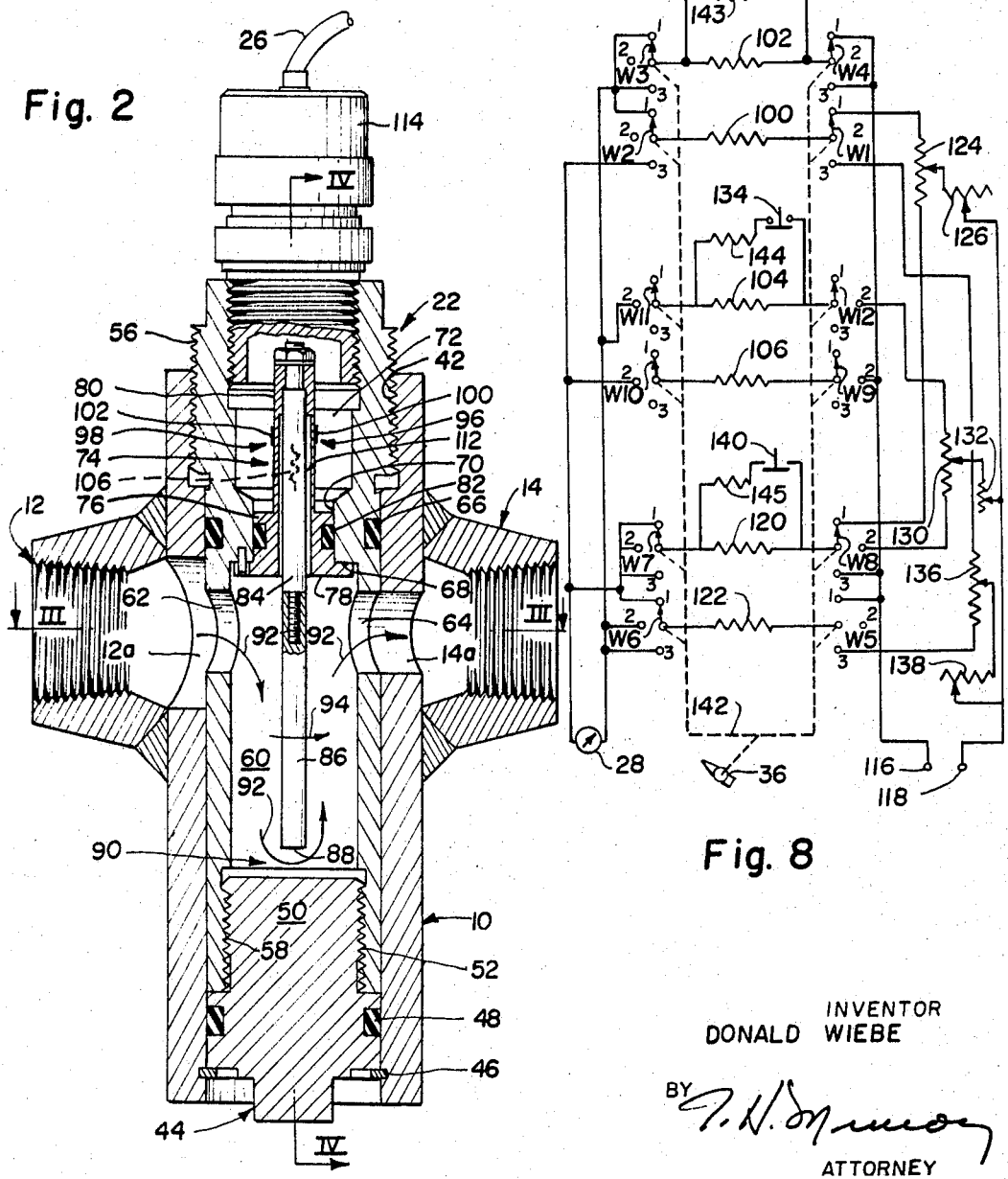
INVENTOR
DONALD WIEBE
ATTORNEY United States Patent Office 3,477,289
Patented Nov. 11, 1969

3,477,289
COMBINED RATE OF FLOW, PRESSURE AND TEMPERATURE GAGE
Donald Wiebe, Greensburg, Pa., assignor to William S. Hansen, doing business as A. Stucki Company, Pittsburgh, Pa.
Filed Aug. 25, 1966, Ser. No. 575,094
Int. Cl. G01f 1/00
U.S. Cl. 73—198          9 Claims

ABSTRACT OF THE DISCLOSURE

A combined flow rate, pressure and temperature measuring probe having a tubular member projecting from one end of the probe and a cantilever vane secured to the outermost projecting end of the tubular member. Displacement of the vane due to fluid flow is measured by two strain gages mounted on the tubular member; while another two strain gages sense pressure when the probe is adjusted to stop fluid flow. Temperature may be determined by an appropriate connection of the gages into a strain gage bridge.

---

As is known, it is often difficult to locate the part or parts of a hydraulic or other fluid circuit which is not functioning properly. Such fluid circuits usually consist of a pump, one or more fluid motors or cylinders driven by the pump, and a series of valves for controlling the flow of fluid between the pump and the motor. If it should happen, for example, that the power delivered to a fluid motor decreases, the trouble may be due to malfunctioning of any one or more of the many parts of the fluid circuit. While it is possible to progressively dismantle the entire fluid circuit and individually test each part, this is obvious a cumbersome, time-consuming and expensive procedure, particularly when it is remembered that many fluid circuits are complicated and include components and conduits located at inaccessible points within a piece of equipment.

The location of a faulty part in a hydraulic circuit can be determined without dismantling the system. This can be accomplished by measuring the flow rate, pressure and temperature at various points in the system to isolate a particular faulty unit. In the past, portable circuit testers have been provided which can be connected into the system to determine the rate of flow, pressure and temperature at selected points. While such testers eliminate the necessity for complete dismantling of the system, they nevertheless require the various conduits to be disconnected at various points in order to connect the tester itself into the circuit. This is not only a cumbersome procedure, but also results in diversion of fluid through the tester which alters the characteristics of the fluid circuit. Furthermore, there is always the possibility of leakages occurring when the various conduits are again connected during the re-assembly of the fluid circuit.

Accordingly, as an overall object, the present invention seeks to provide apparatus in the form of a unitary probe which can be inserted into a hydraulic circuit at selected points without requiring any dismantling, for the purpose of measuring pressure, rate of flow and temperature.

Another object of the invention is to provide an improved unitary probe for measuring the rate of flow, pressure and temperature of fluid flowing within a conduit.

A further object of the invention is to provide an improved unitary probe for hydraulic or other fluid circuits, which probe incorporates valve means for changing the pressure drop in the system and its components by restricting fluid passing through the probe.

Still another object of the invention is to provide an improved, combined pressure and rate of flow tester employing resistance-type strain gages and wherein the gages are external to the fluid within a hydraulic circuit being tested.

A further object of the invention is to provide an improved unitary probe insertable within cavities incorporated in a hydraulic circuit, which probe is hydraulically balanced. That is to say, there are no fluid forces within the probe itself tending to dislodge the probe from the cavity.

Still another object of the invention is to provide a unitary probe employing a more easily stressable diaphragm of novel design, whereby the flow rate, pressure and temperature measuring ability of the unit is increased.

In accordance with the present invention, a unitary probe is provided which is adapted to be inserted into a cylindrical receptacle permanently installed in a fluid conduit of a hydraulic or other fluid circuit. The unitary probe is provided with inlet and outlet ports which are registrable with the inlet and outlet ports of the cylindrical receptacle, the overall arrangement being such that fluid flows through the inlet ports into the interior of the probe and then out through the outlet ports. The probe is arranged to be closed at both ends and, hence, it is hydraulically balanced. That is to say, the fluid forces acting on the opposite ends of the probe are equal in magnitude and have opposite lines of action.

The present probe incorporates a relatively easily stressable diaphragm provided with means, preferably in the form of resistance-type strain gages for measuring the rate of flow, pressure and temperature of the fluid passing through the probe. These strain gages are attached to the diaphragm in predetermined positions relative to the diaphragm itself and to the direction of fluid flow. A vane-type flow sensing element resides within the probe and is positioned generally perpendicular to the direction of fluid flow so that it is deflected by the force of the flowing fluid. The vane-type flow sensing element is secured to the diaphragm in a manner such that certain ones of the strain gage elements are deformed to produce, in a known manner, an indication of the rate of flow of the fluid. Bridge circuit means are provided which are electrically connected to the strain gage elements and to a meter whereby the fluid flow, the pressure and the temperature of the fluid are individually measured and indicated on the meter.

The above and other objects and advantages of the present invention will become apparent from the following detailed description by reference to the accompanying drawings, in which:

FIG. 2 is a cross-sectional view, taken in the plane of FIG. 1B, illustrating the probe of the present invention inserted into the receptacle permanently installed in the fluid conduit of FIGS. 1A and 1B;

FIGS. 7A–7C illustrate equivalent bridge circuit arrangements in accordance with the invention for measuring flow rate, pressure and temperature, respectively; and FIG. 8 is a schematic diagram of the actual circuitry including switches utilized in accordance with the invention for measuring fluid flow, pressure and temperature.

Figure 1A:
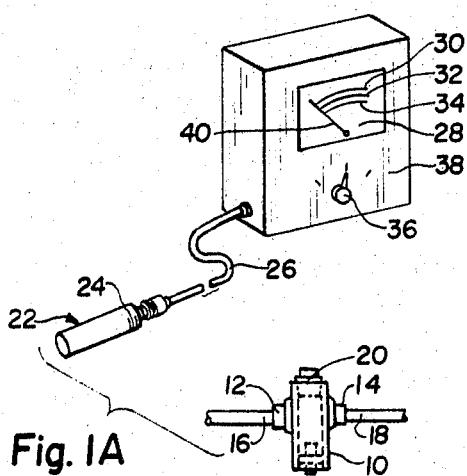
FIGURES 1A and 1B illustrate the manner in which the probe of the present invention may be inserted into a fluid conduit.
Figure 1B:
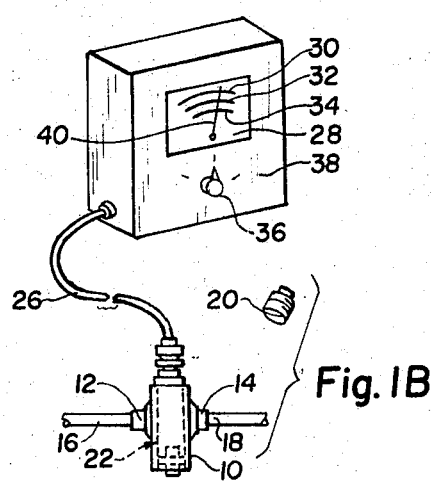

Referring now to the drawings, and in particular to FIGS. 1A and 1B, a generally cylindrical receptacle 10 is provided with inlet and outlet ports 12 and 14, respectively, adapted for connection to fluid conduits 16 and 18. As will be understood, the fluid conduits 16 and 18 are included in a fluid circuit which, in the usual case, includes a pump, one or more fluid motors or cylinders, and valves for controlling the flow of fluid from the pump to the motors or cylinders. The receptacle 10 is permanently connected into the fluid circuit, and a plurality of such receptacles may be spaced at selected testing points throughout the circuit.

As will hereinafter be explained, one end of the receptacle is open and receives a plug 20, as in FIG. 1A, which prevents the escape of fluid from the receptacle 10 under normal operating conditions. The plug 20, however, may be removed from the receptacle 10 when the fluid within the circuit is not under pressure, and a generally cylindrical testing probe 22 inserted therein, as shown in FIG. 1B. The probe 22 is provided with external threads 24 which engage internal threads, not visible, provided in the receptacle 10 to retain and seal the probe 22 within the receptacle 10.

As will be seen, the probe 22 includes means, preferably in the form of resistance-type strain gages, for measuring both the pressure and rate of flow of fluid passing through the conduits 16 and 18, as well as its temperature. The strain gages are connected through a cable 26 to a meter 28 having three dials or graduated scales 30, 32 and 34 for indicating rate of flow, pressure and temperature of the fluid flowing through the conduits 16, 18. For example, the graduated scale 30 is calibrated to indicate pressure; the graduated scale 32 is calibrated to indicate flow rate; and the graduated scale 34 is calibrated to indicate temperature. By selectively adjusting a knob 36 on the meter housing 38 for a temperature, a pressure or a rate of flow setting, anyone of these factors may be observed from the position of the pointer relative to the selected one of the graduated scales 30, 32 or 34.

As best shown in FIG. 2, the cylindrical receptacle 10 has an interior cavity 40 including internal threads 42 provided at one end thereof and a bottom plug 44 inserted into its other end. The plug 44 is retained therein, for example, by means of a snap ring 46. The plug 44 is provided with an annular gasket 48 for sealing the lower end of the cylindrical receptacle 10 and an end portion 50 of reduced diameter, having external threads 52. The plug 44 remains substantially in the position shown in FIG. 2 and cooperates with the plug 20 (FIG. 1B) to seal the receptacle 10 when the probe 22 is not in use.

In the wall of the receptacle 10, there is provided a relatively large inlet opening 12a and an outlet opening 14a. The inlet and outlet openings 12a, 14a are diametrically opposed and comprise portions of the inlet and outlet ports 12, 14, respectively.

Figure 4:
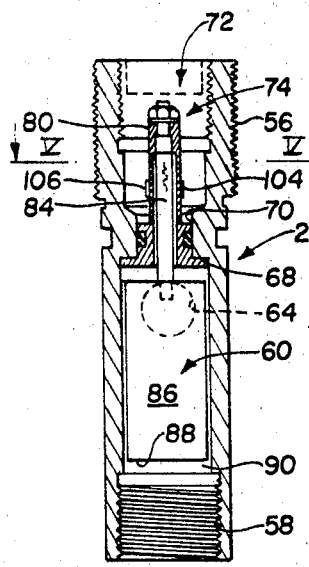
FIG. 4 is a cross-sectional view taken substantially along the line IV—IV of FIG. 2, illustrating the probe of the present invention.
Figure 5:
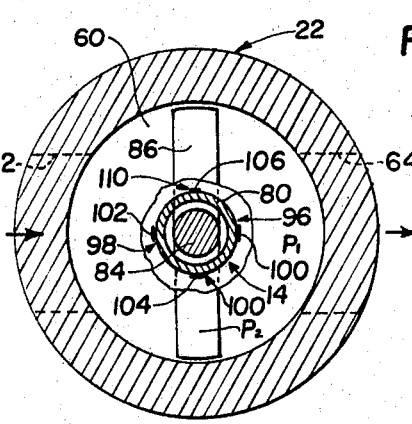
FIG. 5 is a cross-sectional view, taken substantially along the line V—V of FIG. 4.

Received within the cavity 40 is the probe 22 which, as can best be seen in FIGS. 2 and 4, is cylindrical in shape and has external threads 56 at its upper end engageable with the internal threads 42 of the receptacle 10, and internal threads 58 at its lower end engageable with the external threads 52 of the bottom plug 44. It is preferred, that the pitch of the threads 42, 52, 56 and 58 be identical so that the probe 22 may be screwed simultaneously into the receptacle 10 and onto the bottom plug 44.

In this specification, portions of the receptacle 10 and the probe 22 have been and will be identified as upper, lower and intermediate portions so as to correspond with the orientation of these elements as illustrated in the drawings. It should be noted, however, that the receptacle 10 and the probe 22 may be placed in any position dictated by the conduits of the fluid circuit being tested, without effecting the operation of the probe 22.

Referring still to FIGS. 2 and 4, the probe 22 is provided with a chamber 60 and inlet and outlet ports 62, 64, respectively, which are registrable with the inlet and outlet ports 12 and 14, respectively, of the receptacle 10. The inlet and outlet ports 62, 64 are diametrically opposed and are adapted to be axially aligned with the inlet and outlet openings 12a, 14a to permit a maximum amount of fluid to flow through the device. The overall arrangement is such that fluid will flow through the inlet ports 12, 62, into the chamber 60 and out through the outlet ports 64, 14. The probe 22 is provided with an annular gasket 66 carried by a groove in the wall thereof and at a position above the ports 62, 64 so as to prevent the escape of fluid through the upper end of the receptacle 10.

Figure 3A:
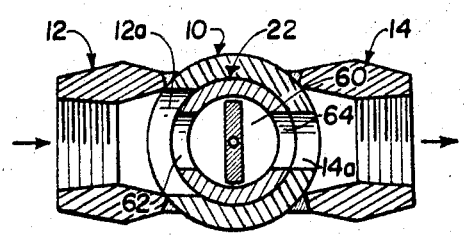
FIGS. 3A and 3B are cross-sectional views, taken along the line III—III of FIG. 2, illustrating the valve action of the present probe.
Figure 3B:
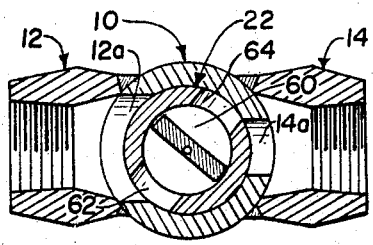

The probe 22 is rotatable within the cavity 40 so as to change the pressure drop in the system or to substantially entirely restrict the flow of fluid through the system. As can be seen in FIG. 3A, the probe 22 is shown in a first extreme position wherein the inlet and outlet ports 62, 64 thereof are axially aligned with the inlet and outlet ports 12, 14 of the receptacle 10. In this position, a maximum rate of flow of the fluid is permitted through the probe 22. In FIG. 3B, the probe 22 has been rotated to a second extreme position wherein the outlet port 64 of the probe 22 does not communicate with the outlet opening 14a and, hence, the fluid cannot flow between the inlet and outlet ports 12, 14 of the receptacle 10. It should be noted, however, that because of the relatively large size of the inlet opening 12a, the inlet port 62 of the probe 22 still communicates fluid into the chamber 60 for the purpose of measuring the static pressure of the fluid, as will be described. It should be evident that by positioning the probe 22 at positions between the first and second extreme positions illustrated in FIGS. 3A and 3B, respectively, the pressure drop through the system may be varied.

With reference still to FIGS. 3A and 3B, it will be appreciated that the relatively large size of the inlet opening 12a enhances uniform flow into the inlet port 62 at all times. That is to say, uniform flow is maintained even up to the time at which the outlet port 64 no longer communicates with the outlet opening 14a as shown in FIG. 3B. Consequently, all throttling is accomplished at the outlet port 14 of the gage 10.

As can be seen in FIGS. 2 and 4, the probe 22 is provided with an inwardly extending annular shoulder 68 and an axially extending bore 70 both of which are positioned adjacent to but above the ports 62, 64. The bore 70 communicates with an upper chamber 72 provided in the probe 22.

Extending through the bore 70 is diaphragm means 74 which, as will be described, takes an active part in the measurement of the fluid flow, the pressure and the temperature of the fluid flowing through the probe 22. The diaphragm means 74 comprises a lower cylindrical body portion 76 engaged in the bore 70 and having a radial flange 78 at one end engaged with the annular shoulder 68, and a tubular segment 80 at its other end projecting into the upper chamber 72 of the probe 22. An annular gasket 82 carried by the cylindrical body portion 76, prevents the escape of fluid from the chamber 60 of the probe 22.

Extending axially through the diaphragm means 74 is a pin 84 having its upper end secured to the upper end of the tubular segment 80 and its lower end projecting into the chamber 60 and threaded into or otherwise secured to a vane 86. As can be best be seen in FIG. 2, the vane 86 is, in effect, a cantilever vane being secured to the tubular segment 80 only at the remote or upper end of the tubular segment 80. As can best be seen in FIG. 4, the width of the vane 86 is slightly less than the inner diameter of the chamber 60 so as to substantially restrict the flow of fluid between the vertical edges of the vane 86 and the walls of the chamber 60. As can be seen, the vane 86 is positioned substantially perpendicular to the flow of fluid and has a lower edge 88 which is vertically spaced from the upper face of the bottom plug 44 so as to provide a passageway 90. The overall arrangement is such that a major portion of the fluid will flow between the inlet ports 12, 62 and the outlet ports 64, 14 along the approximate path indicated by the arrows 92 in FIG. 2. When the fluid from the inlet ports 12, 62 impinges on the left face of the vane 86 as viewed in FIG. 2, it exerts viscous drag along the lower edge 88 of the vane 86 so as to deflect the vane 86 in a counterclockwise direction as illustrated by the arrow 94 in FIG. 2.

Referring now to FIGS. 2, 4–6, deflection of the vane 86 will effect corresponding bending of the tubular segment 80 so that tensile bending stresses are set up at area 96 while compressive bending stresses are set up at area 98 of the tubular segment 80. These bending stresses will have a maximum value in a first plane, indicated by the dash-dot line $P_1$, and have zero value in a second plane, indicated by the dash-dot line $P_2$. The plane $P_2$ corresponds to what is commonly termed the neutral surface (plane of zero stress) of a beam, such as the tubular segment 80, undergoing bending.

Secured to the outer surface of the tubular segment 80 at the areas 96 and 98, is a first pair of resistance-type strain gages 100 and 102. The strain gages 100 and 102 can be secured at any location in the areas 96, 98 and along the first plane $P_1$ as long as one gage is subjected to strain opposite to that experienced by the other gage. However, the strain gages 100 and 102 are preferably positioned adjacent to the top or upper end of the tubular segment 80 as shown in FIGS. 2 and 4. As will hereinafter be explained, the strain gages 100 and 102 are connected to a bridge circuit arrangement to indicate deflection of the pin 84 and vane 86 as reflected by the tensile and compressive bending stresses experienced by the tubular segment 80 at the areas 96 and 98 to indicate the rate of flow of fluid through the conduits 16 and 18 (FIG. 1B). Although the flow meter portion of the invention will operate with a single one of the gages 100 or 102, the use of two gages as shown provides temperature compensation and a larger output.

Referring still to FIGS. 2 and 4–6, the measurement of the pressure of the fluid within the chamber 60 is accomplished by means of a second pair of resistance-type strain gages 104 and 106. The strain gages 104 and 106 are secured at areas 108 and 110 of the tubular segment 80 in the plane $P_2$. Although the meter portion of the invention will operate with a single one of the gages 104 or 106, the use of two gages is preferred inasmuch as a larger output results. The strain gages 104, 106 may be secured at any location along the areas 108, 110 but they are preferably positioned below the strain gages 100, 102, adjacent to the cylindrical body portion 76, where the tubular segment 80 undergoes a lesser amount of bending. Furthermore, each of the strain gages 104, 106 are preferably positioned so as to be symmetrical about the plane $P_2$. In this position, the gages 104, 106 are substantially entirely unaffected by the bending of tubular segment 80. For example, as viewed in FIG. 5, the left half of the gages 104, 106 will be subjected to compressive bending stresses while the right half of the gages 104, 106 will be subjected to tensile bending stresses. These forces are substantially equal and will affect the resistance of the gages in opposite senses. Hence, these forces will cancel each other.

Figure 6:
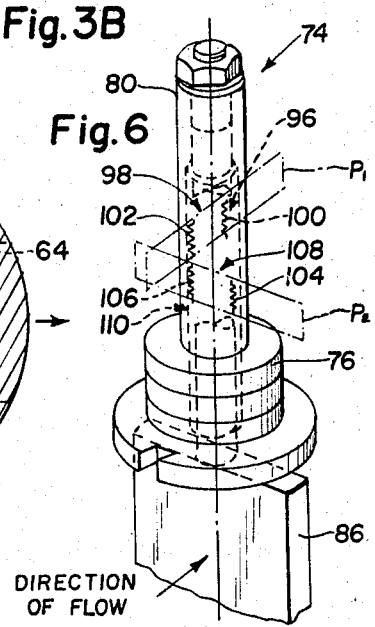
FIG. 6 is a fragmentary isometric view of a stressable diaphragm employed in the present probe and showing the relative positions of strain gage elements utilized in the present probe.

In FIG. 6, the first and second pairs of resistance type strain gages 100, 102 and 104, 106 are shown extending longitudinally of the tubular segment 80. It is to be understood, however, that the strain gages 100, 102 and 104, 106, could, instead, be positioned to extend circumferentially around the tubular segment 80 without affecting the operation of the gage.

As can best be seen in FIG. 2, the diameter of the pin 84 is less than the inner diameter of the tubular segment 80. Hence, an annular space 112 is provided which communicates with the chamber 60 and which is at all times filled with the flowing fluid. Accordingly, the inner surface of the tubular segment is at all times subjected to the pressure of the flowing fluid. In this respect, the tubular segment 80 functions as a diaphragm which is expanded radially by an amount directly proportional to the fluid pressure. In response to the radial expansion of the tubular segment 80, the areas beneath the strain gages 104, 106 will be placed in tension to produce a signal which is directly porportional to the fluid pressure, as will hereinafter be more fully explained.

A connector 114 (FIG. 2) is threaded into the upper end of the probe 22. Each of the strain gages 100, 102, 104 and 106 has electrical conductors (not shown) which extend into the connector 114 and are electrically interconnected to the conductors of the cable 26 which are sequentially electrically connected to the aforesaid bridge circuits, hereinafter described in detail. It will be appreciated that none of the strain gages 100–106 are within the fluid flowing through the chamber 60. This is a distinct advantage in that it is not necessary to physically protect the strain gages from fluid effects, particularly when high pressures are encountered.

Referring to FIGS. 7A–7C, three circuit diagrams are illustrated for measuring flow rate, pressure, and temperature, respectively.

In FIG. 7A, for example, a bridge circuit arrangement is illustrated for measuring flow rate. It includes the two strain gages 100 and 102 connected in series between input terminals 116 and 118 adapted for connection to a source of driving potential, not shown. Also connected in series between the input terminals 116 and 118 are a pair of strain gages 120 and 122 external to the probe 22 and affixed to a piece of metal positioned, for example, within the meter housing 38. The bridge circuit may be initially balanced by means of rheostat 124; and the meter initially calibrated for a given flow rate by means of rheostat 126 which can be selectively adjusted to a given indicator reading while placing a fixed resistor 143 in parallel with strain gage 102 by means of switch 128.

The meter 28, comprising a galvanometer, is connected between the junction of gages 120, 122 and the junction of gages 100, 102, substantially as shown, to complete the bridge circuit. As will be appreciated, the bridge circuit will be balanced and no current will flow through the meter 28 when the ratio of the impedance of element 100 and part of element 124 with respect to element 102 is equal to that of element 120 and the remaining portion of element 124 with respect to element 122. Thus, the bridge will be balanced when:

$$\frac{R100+C(R124)}{R102}=\frac{R120+(1-C)(R124)}{R122}, C<1$$

where R100, R102, R120 and R122 are the instantaneous resistance values of gages 100, 102, 120 and 122, respectively. R124, the balancing resistor, is assumed small compared to the four principal resistors in the bridge. Since strain gage 100 is placed in tension under flow conditions while strain gage 102 is placed in compression, their combined tension and compression strains are cumulative in their action on the bridge, thereby increasing the sensitivity considerably beyond what would be obtained with only a single strain gage on the tubular segment 80. Another advantage of the two-gage arrangement is that they compensate for temperature changes. Thus, if the temperature of the probe should increase, the tubular segment 80 will expand and the conducivity of the gage wire filaments will change but the net impedances of strain gages 100 and 102 will change by the same amount, the same holds true for the pressure effect, thereby maintaining the same ratio between the two such that the bridge circuit remains balanced and will respond only to deflections in the vane 86. The same is true of gages 120 and 122 affixed to a piece of metal within housing 38 (FIGS. 1A and 1B) at room temperature.

In FIG. 7B, the equivalent bridge circuit arrangement for pressure readings is shown wherein elements corresponding to those shown in FIG. 7A are identified by like reference numerals. In this case, however, the pressure strain gages 104 and 106 are in opposing legs of the bridge circuit, as are the strain gages 120 and 122. Thus, the reading on meter 28 will be responsive to pressure rather than flow rate. The bridge is initially balanced by rheostat 130 and calibration effected by elements 132 and 134 and 144 in the manner described in connection with FIG. 7A. The bridge will be balanced only when:

$$\frac{R104+C(R130)}{R122}=\frac{R120+(1-C)(R130)}{R106}, C<1$$

and again the resistance of the element 130 is small compared to the remaining bridge elements. Thus if the fluid pressure increases, the impedance R102 and R106 of the strain gages 104 and 106 will, under these circumstances, be assumed to increase. This unbalances the bridge causing current to flow through the meter 28.

In FIG. 7C, the equivalent bridge circuit configuration for temperature measurements is shown wherein elements corresponding to those shown in FIGS. 7A and 7B are again identified by like reference numerals. In this case, however, the strain gages 120 and 122 external to the probe 22 are in opposing legs of the bridge circuit, as are the flow-measuring strain gages 100 and 102. The bridge is initially balanced by rheostat 136, and calibration effected by elements 138, 140 and 145. The strain gages 120 and 122 are not within the probe 22 but external thereto and will be at ambient temperature (i.e., room temperature). For example, strain gages 120 and 122 may be within the meter housing 38. Thus, the bridge of FIG. 7C will compare the temperature of the fluid contacted by probe 22 with the known temperature of the surrounding atmosphere. Should the known temperature change, this can be compensated for by changing the calibration of the bridge. The strain gages 100 and 102, however, will be responsive to the temperature of the fluid within the chamber 60. Now the bridge will be balanced only when:

$$\frac{R100+C(R136)}{R120}=\frac{R122+(1-C)(R136)}{R102}, C<1$$

and again the resistance of element 136 is small compared to the remaining bridge elements. Let us assume, for example, that the temperature of fluid within the chamber 60 increases. Under these circumstances, the impedances R100 and R102 of the strain gages 100 and 102 will be assumed to increase. This unbalances the bridge, and the unbalance is again cumulative. At the same time, changes in the flow rate, for example, will not affect the bridge circuit configuration of FIG. 7C since an increase in the impedance R100 of element 100 due to an increase in the flow rate, for example, will be compensated for by an equal and opposite decrease in the impedance R102 of the element 102. The bridge circuit configuration of FIG. 7C, therefore, is responsive only to temperature variations or differences between the meter and the flow measuring element. As will be understood, the strain gages 100 and 102 could be replaced by the pressure responsive strain gages 104 and 106 if desired with equal effectiveness.

In FIG. 8 the switching arrangement for effecting the equivalent bridge circuits shown in FIGS. 7A, 7B and 7C is illustrated. It includes a rotary switch element having a plurality of movable wipers W1–W12 thereon mechanically interconnected as by a common shaft schematically illustrated by the reference numeral 142 and connected to dial 36 such that all of the wipers will be on their No. 1, No. 2 or No. 3 contact simultaneously.

With the wipers in the position shown in FIG. 8 wherein they are connected to the No. 1 contacts, the flow measuring bridge circuit arrangement of FIG. 7A is effected. Thus, input terminal 118 is connected through rheostat 126, 124 and wiper W1 to the strain gage 100. The other end of the strain gage 100 is connected through wiper W2 to one input terminal of the meter 28 and through wiper W3 to one end of the strain gage 102. The other end of the strain gage 102 is then connected through wiper W4 to input terminal 116. At the same time, the external strain gages 120 and 122 are connected between input terminal 116 and the rheostat 124 through wipers W5, W6, W7 and W8. This, in effect, completes the bridge circuit arrangement of FIG. 7A.

To effect the pressure measuring bridge circuit arrangement of FIG. 7B, all of the wipers are moved to their No. 2 contacts. Under these circumstances, strain gages 100 and 102 are disconnected from the circuit, while strain gages 104 and 106 are connected into the circuit through wipers W9, W10, W11 and W12. Thus, with the wipers on the No. 2 contacts, a circuit is completed from input terminal 118 to reheostats 132, 130, wiper W12, strain gage 104, wiper W11 to one input terminal of meter 28. This same terminal of meter 28 is connected through wiper W10, strain gage 106 and wiper W9 to input terminal 116. The connections of the strain gages 120 and 122 to the meter 28 are the same as before; however their opposing ends are now connected through wipers W5 and W8 to input terminal 116 and rheostat 130, respectively, rather than rheostat 124.

In order to measure temperature, the wipers are moved to their No. 3 contacts, in which case the rheostats 138 and 136 are connected in a bridge circuit arrangement with elements 100, 102, 120 and 122 to effect the equivalent circuit of FIG. 7C.

Although the invention has been shown in connection with one specific embodiment, it will be readily apparent to those skilled in the art that various changes in form and arrangement of parts may be made to suit requirements without departing from the spirit and scope of the invention.

I claim as my invention:

1. A device for measuring both the fluid flow within a conduit as well as the pressure therein, comprising a chamber closed at both ends and having inlet and outlet ports in its wall adapted for connection to a conduit such that fluid passing through the conduit will flow into the chamber through the inlet port and out through the outlet port, a tubular segment projecting outwardly from one end of said chamber and having an open end communicating with said chamber, an element rigidly fixed to the end of said tubular segment opposite said open end and extending into said chamber at generally right angles to the flow of fluid therethrough whereby said element will be deflected by fluid flowing between the inlet and outlet ports, first means for measuring deflection of said element and hence the rate of fluid flow through said chamber, and second means for measuring expansion of said tubular segment in response to the pressure within the chamber, which expansion is indicative of said pressure within the chamber.

2. The device as defined in claim 1 wherein said tubular segment has a first end secured to one end of said chamber and a second end remote from said chamber, and wherein said element comprises a vane having one end rigidly fixed to said second end of said tubular segment and extending therefrom in cantilever beam relation into the interior of said chamber, said vane being positioned generally at right angles to the flow of fluid through the chamber.

3. The device as defined in claim 1 wherein said first measuring means comprises resistance-type strain gage means in contact with the outer surface of said tubular segment.

4. The device as defined in claim 3 wherein said strain gage means are in contact with the outer surface of said tubular segment and are positioned on surface areas of said tubular segment which are subjected to maximum stresses by the deflection of said element.

5. The device as defined in claim 1 wherein said second measuring means comprises resistance-type strain gage means in contact with the surface of said tubular segment.

6. The device as defined in claim 1 wherein said resistance-type strain gage means are in contact with surface areas of said tubular segment which are subjected to minimum stresses by the deflection of said element.

7. The device as defined in claim 1 wherein said tubular segment has a first end secured to one end of said chamber and a second end remote from said chamber, said first end being open to said chamber so that the pressure of the fluid within said chamber causes extension of said tubular segment, and wherein said second measuring means comprises a pair of resistance-type strain gage devices on the outer surface of said tubular segment, positioned at diametrically opposite areas of said tubular segment and perpendicular to the flow of fluid through said chamber.

8. The device as defined in claim 1 wherein said first measuring means comprises a pair of resistance-type strain gage devices on the outer surface of said tubular segment, positioned at diametrically opposite areas of said tubular segment and aligned with the flow of fluid through said chamber, said opposite areas being subjected to bending stresses by the deflection of said element.

9. The device as defined in claim 1 wherein said first measuring means comprises a first pair of resistance-type strain gage devices on the outer surface of the tubular segment, positioned at diametrically opposite areas of said tubular segment and aligned with the flow of fluid through the chamber, and including bridge circuit means operatively connected to said first pair of strain gage devices for indicating deflection in said vane and hence the rate of flow of fluid through said chamber; and wherein said second measuring means comprises a second pair of resistance-type strain gage devices on the outer surface of said tubular segment positioned at right angles with said first pair of strain gage elements and at points between said first pair of strain gage elements and said first end of said tubular segment, and including bridge circuit means operatively connected to said second pair of strain gage devices for indicating extension in said tubular segment and hence the pressure within the chamber.

References Cited
UNITED STATES PATENTS

| | | | |
|---|---|---|---|
| 1,917,317 | 7/1933 | Nacey | 73—228 |
| 2,420,148 | 5/1947 | Ostergren | 73—398 |
| 2,509,421 | 5/1950 | Carter | 73—147 |
| 2,952,753 | 9/1960 | Kmiecik et al. | 73—228 |
| 3,338,093 | 8/1967 | Usury et al. | 73—147 |

RICHARD C. QUEISSER, Primary Examiner

R. S. SALZMAN, Assistant Examiner

U.S. Cl. X.R.

73—344